April 8, 1941. R. A. MAYPOLE 2,237,605
MECHANICAL HORSE
Filed Aug. 17, 1938 3 Sheets-Sheet 1
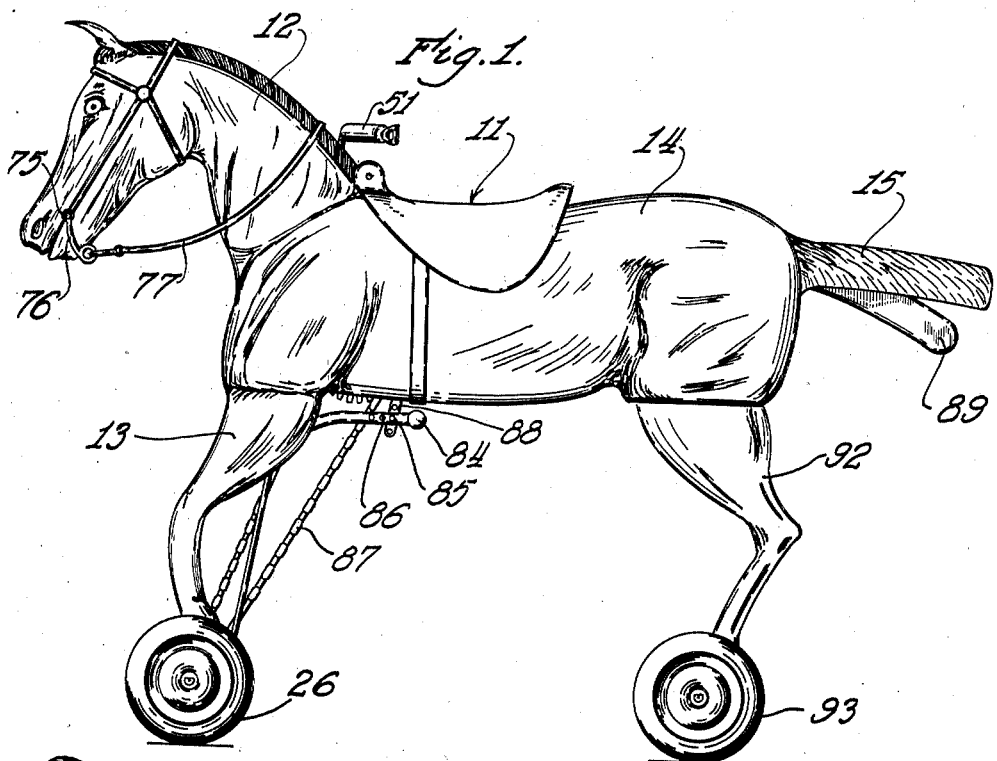
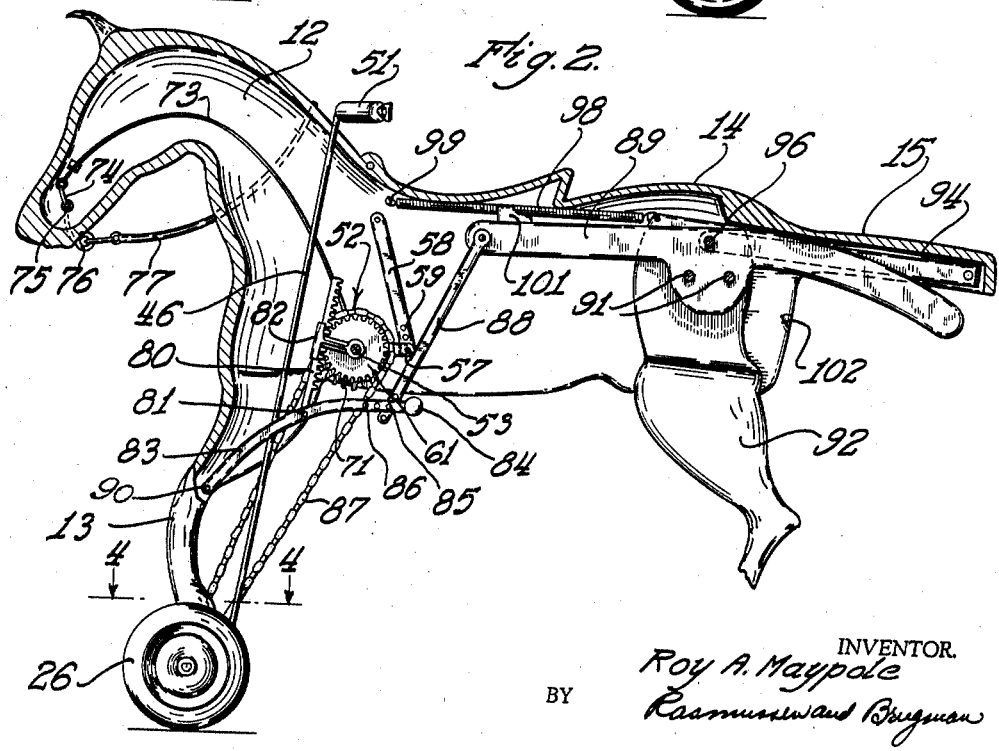
INVENTOR.
Roy A. Maypole
BY Rasmussen and Bergman
ATTORNEYS.

April 8, 1941.    R. A. MAYPOLE    2,237,605
MECHANICAL HORSE
Filed Aug. 17, 1938    3 Sheets-Sheet 2
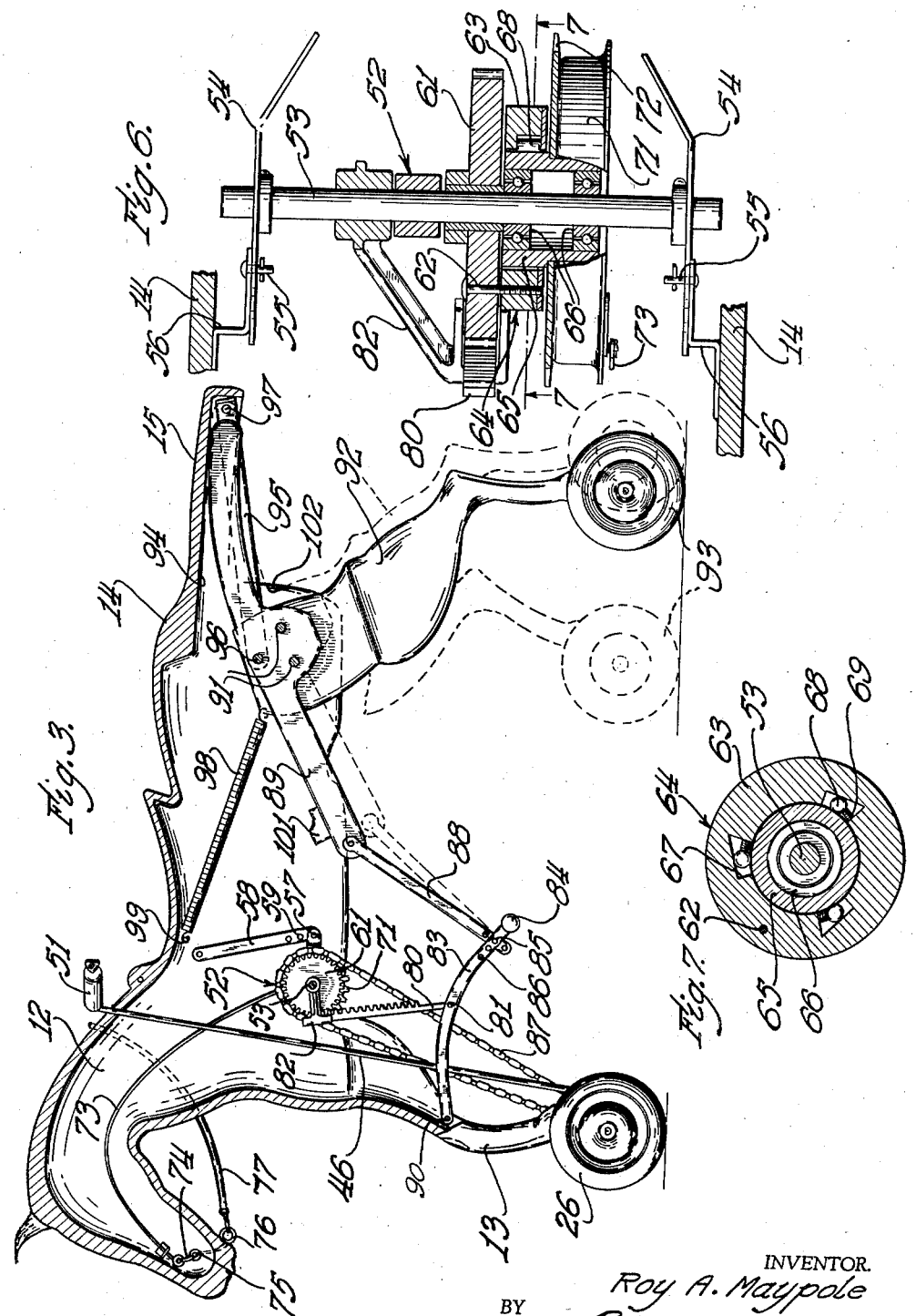
INVENTOR.
Roy A. Maypole
BY
Rasmussen and Brigman
ATTORNEYS.

April 8, 1941.  R. A. MAYPOLE  2,237,605
MECHANICAL HORSE
Filed Aug. 17, 1938  3 Sheets-Sheet 3

INVENTOR.
Roy A. Maypole
BY Rasmussen and Brugman
ATTORNEYS.

Patented Apr. 8, 1941

2,237,605

UNITED STATES PATENT OFFICE 2,237,605

MECHANICAL HORSE

Roy A. Maypole, Chicago, Ill.

Application August 17, 1938, Serial No. 225,271

8 Claims. (Cl. 280—1.18)

This invention relates in general to vehicles, and more particularly to a pleasure vehicle in the form of a horse which is adapted to be propelled by the rider.

A principal object of the invention is the provision of a mechanical horse mounted on wheels, and so constructed, that by alternately putting pressure upon and releasing pressure from the stirrups, a rider may cause it to move forwardly in simulation of the movement of a real horse.

Another important object of the invention is the provision in such a mechanical horse of steering means and means for retarding or stopping any movements of the horse.

A further object of the invention is the provision in a mechanical horse which is mounted upon wheels of means for driving the front wheels by vertically oscillating one or both of a pair of stirrup members mounted on the horse.

Another object of the invention is the provision of a mechanical horse having pivotally mounted rear legs which are adapted to be swung rearwardly and forwardly, by vertically oscillating stirrup members mounted on the horse, to raise and lower the rear end of the horse to simulate the movements of a real horse.

A further object of the invention is the provision in a mechanical horse of means for readily adjustably mounting the driving mechanism therefor.

Numerous other objects and advantages of the invention will be apparent as it is better understood from the following description, which, when taken in connection with the accompanying drawings, discloses a preferred embodiment thereof.

In the drawings,

Figure 1 is a side elevational view of a mechanical horse embodying the features of the instant invention;

Figure 2 is a longitudinal vertical section through the vehicle of Fig. 1 with the leg portions thereof in retracted position;

Figure 3 is a view similar to Fig. 2 with the leg portions shown in full lines in extended position;

Figure 6 is a horizontal detail sectional view of that portion of the drive mechanism disposed interiorly of the horse;

Figure 7 is a vertical detail section of the clutch mechanism taken substantially on the line 7—7 of Fig. 6;

Figure 4:
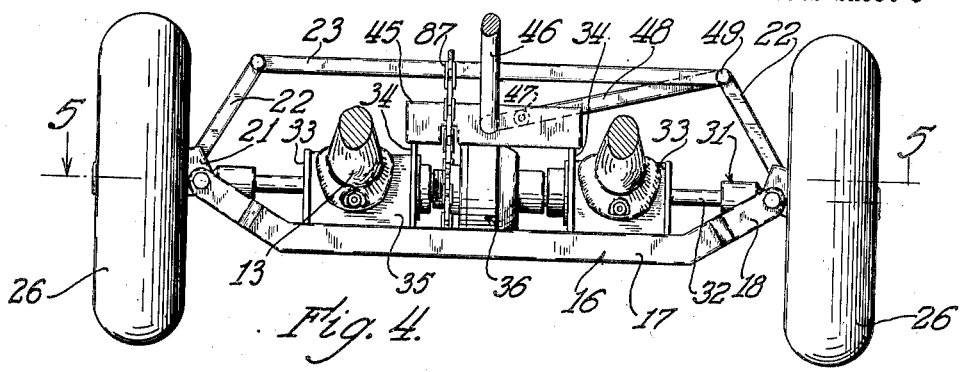
Figure 4 is a top plan view of the front axle assembly taken substantially on the line 4—4 of Fig. 2.

Referring more particularly to the drawings, reference numeral 11 indicates in general a hollow framework or chassis which is formed in any suitable manner to simulate the three dimensional shape or configuration of a head, body, front legs and tail of a horse. The head portion is indicated by reference numeral 12, each of the front legs by reference numeral 13, the body by reference numeral 14 and the tail by reference numeral 15. The framework or chassis 11 is formed as a unitary structure, being preferably cast or stamped from a suitable light weight material, such as an aluminum alloy, with the several parts thereof joined rigidly together in any desired manner.

Figure 5:
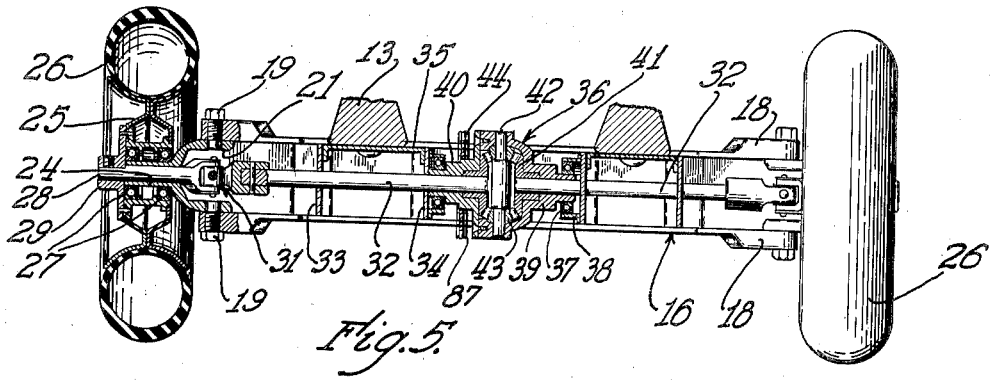
Figure 5 is a vertical section taken substantially on the line 5—5 of Fig. 4.

Each of the front legs 13 is mounted at its lower end upon a front axle assembly, indicated generally by reference numeral 16, as shown more particularly in Figs. 4 and 5. The front axle assembly 16 comprises a channel-shaped transverse frame member 17 which is bent to extend forwardly for a short distance adjacent each end, and terminates at each end in upper and lower bearing flange portions 18. At each end the upper and lower bearing flange portions 18 are provided with stud bolts 19 extending therethrough to provide axially aligned shaft portions at their inner ends which pivotally secure a wheel axle member 21 therebetween. Each of the members 21 has the rearward end of a steering link 22 pivotally secured thereto, the forward ends of the links 22 being in turn pivotally secured to the opposite ends of a transversely disposed lever 23.

Each of the members 21 terminates at its outer end in a hollow shaft or axle portion 24 (Fig. 5) upon which the hub portion 25 of a wheel member 26, of any suitable construction, is freely rotatably mounted by means of a pair of ballbearing races 27. A semi-axle 28 extends through and is rotatably mounted within the bore of the shaft portion 24 of the wheel axle member 21, and has an end plate 29 rigidly mounted on its outer end which is in turn secured in any suitable manner to the hub portion 25 of the wheel 26.

The inner end of each of the semi-axles 28 is connected by means of a universal joint 31 of well-known construction to the outer end of a drive shaft 32. Each of the drive shafts 32 extends through and is rotatably supported by a pair of bearing bracket members 33, 34 which are secured in any suitable manner at their rear ends to the channel member 17. The lower end of each of the front legs 13 is mounted upon a horizontal plate 35 which spans and is rigidly secured to the bearing brackets 33, 34.

A differential, indicated generally by reference numeral 36, is rotatably supported at each end by ball bearing races 37 mounted in bearing brackets 38, which are secured in any suitable manner to the inner bearing brackets 34. The differential 36 comprises a pair of hollow housings 39, 40, the outer ends of which are rotatably supported by the ball races 37 and the inner ends of which are rigidly secured together in any suitable manner. The inner ends of the drive shafts 32 extend through and are journaled in these housings 39, 40, respectively. A ring gear 41 is rotatably journaled interiorly of each of the housing members 39, 40, and is rigidly secured to the inner end of its associated drive shaft 32. A transverse shaft 42 extends through the differential 36 and is journaled at its ends in the housing member 39. A pair of spur gears or pinions 43 are mounted in the usual manner upon the shaft 42 so as to mesh with each of the ring gears 41. A sprocket wheel 44 is mounted upon the housing member 40 of the differential 36 for imparting driving movement to the latter which will be transmitted thereby to the drive shafts 32 and semi-axles 28 to rotate the wheels 26.

A transverse bearing plate 45 is rigidly secured to the forward ends of the two bearing brackets 34 (Fig. 4), and serves to rotatably support the lower end of a steering post 46. The lower extremity of the steering post 46 is bent at right angles to terminate in a horizontally disposed end portion below the bearing plate 45 which is pivotally connected at 47 to the inner end of a link 48, which is in turn pivotally connected at its outer end to a pin 49 pivotally connecting the lever 23 with one of the links 22. The steering post 46 extends forwardly through the hollow body portion 14 of the framework or chassis 11 (Fig. 2), and has a suitable steering member or handle 51 secured thereto.

A driving unit, indicated generally by reference numeral 52, is mounted interiorly of the hollow body portion 14 adjacent the front shoulder portions thereof, as shown in Figs. 2 and 3. Referring more particularly to Fig. 6, this driving unit 52 comprises a cross shaft 53 which is supported adjacent each end by a bracket member 54. The forward end of each of the bracket members 54 is provided with a plurality of apertures adapted to be selectively engaged by a pin 55 journaled in the rearward end of a supporting bracket 56 which is rigidly secured in any suitable manner to the side wall portion of the hollow body member 14. The rearward ends of the bracket members 54 are bent inwardly to converge toward each other, and are adapted to be pivotally secured by a pin 57 (Figs. 2 and 3) to the lower end of a supporting lever 58, which is in turn pivotally secured at its upper end in any suitable manner to the body member 14. A plurality of apertures 59 are provided adjacent the lower end of the lever 58 through any one of which the pin 57 may be selectively disposed. With this arrangement, it will be seen that the position of the cross shaft 53 may be selectively adjusted, within certain limits, either forwardly or backwardly, and upwardly or downwardly.

A drive gear 61 is rotatably mounted upon the cross shaft 53 (Fig. 6), and is rigidly connected by means of a plurality of bolts 62 to an annular driving member 63 of a one-way clutch, indicated generally by reference numeral 64. The clutch 64 comprises a driven annular member 65 which is mounted interiorly of the driving member 63 and is rotatably supported upon the cross shaft 53 by a pair of ball bearing races 66. The driving member 63 is provided with three circumferentially spaced apertures 67 on its inner surface, the outer surfaces of which slope outwardly in the manner shown in Fig. 7. Within each of the apertures 67 is a transversely disposed roller 68 and a spring 69 which urges the roller toward the narrow end of the recess. With this arrangement, clockwise movement of the driving member 63, viewing Fig. 7, will cause a jamming of each of the rollers 68 between the outer surfaces of their respective apertures 67 and the outer surface of the driven member 65, to rotate the latter therewith. On the other hand, counter-clockwise rotation of the driving member 63 will result in each of the rollers 68 being moved clockwise against the pressure of their associated springs 69 into the enlarged portion of the associated apertures 67 to permit free movement of the driving member 63 relative to the driven member 65.

As shown in Fig. 6, the driven member 65 of the clutch 64 extends laterally beyond the driving member 63 to support a sprocket wheel 72 and a brake drum 71, both of which are rigidly secured thereto in any suitable manner. A plurality of brake shoes of usual construction are mounted interiorly of the brake drum 71, and are adapted to be moved into braking contact therewith by means of a flexible operating member 73 which extends upwardly and forwardly through the hollow head portion 12 (Figs. 2 and 3), and is connected at its forward end by means of a link 74 to a shaft 75 which extends through and is journaled in the side walls of the head portion 12. Exteriorly of the head portion 12, the shaft 75 is connected at each end to a link 76, the shaft 75 and links 76 being constructed in the form of a bit. The lower ends of each of the links 76 are connected to the forward ends of a flexible member 77 which is draped over the neck portion of the horse to simulate reins. With this arrangement, rearward movement imparted to the reins 77 will result in the actuation of the brake member 71.

Referring now to Figs. 2, 3 and 6, the gear 61 is adapted to be driven by a rack 80 which is held in engagement with the gear and guided in its longitudinal movements by one end of a bracket member 82, the other end of which is journaled upon the cross shaft 53. The lower end of the rack 80 is pivotally connected to a transverse rod 81 which is journaled at each end in a stirrup member or actuating lever 83 intermediate the ends thereof. The forward end of each of the stirrup members 83 is pivotally mounted at 90 interiorly of one of the front leg members 13. At its rearward end, each of the members 83 terminates in an outwardly extending arm or foot rest 84 (Fig. 5). Adjacent the foot rests 84, the two members 83 are joined together by a cross rod 85, which is adapted to be extended through a selected one of a plurality of apertures 86 (Figs.

1 to 3) provided in each of the members 83. A chain 87, or other suitable flexible driving means, extends between the driving sprocket 72 of the unit 52 and the driven sprocket 44 which is secured to the differential 36 of the front axle assembly.

Figure 8:
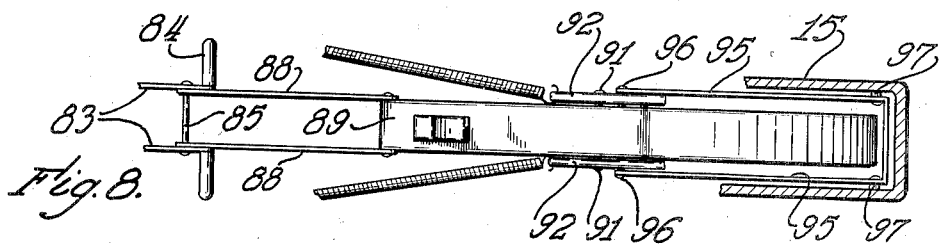
Figure 8 is a detail top plan view of the rear end raising and lowering mechanism, with parts broken away.

Referring now to Figs. 2, 3 and 8, the cross pin 85 is also adapted to extend through a selected pair of a plurality of spaced apertures provided in the lower ends of a pair of levers 88. The upper ends of each of the levers 88 are pivotally connected to the forward end of a rocker beam 89. The rocker beam 89 is rigidly connected by means of a plurality of cross pins 91 to the upper ends of each of two rear leg members 92. At its lower end, each of the rear leg members 92 is pivotally connected to a wheel 93 which is adapted to be freely rotatable thereon, or if desired, may be provided with a one-way clutch mechanism similar to that shown in Fig. 7 for the purpose of preventing clockwise or rearward rotation of the wheel relative to the leg. The upper surface of the rocker beam 89 is curved, for a purpose to be later more fully described, and has longitudinally changing contact with a flat, sloping surface 94 (Fig. 3) forming the upper wall of the rearward portion of the hollow body 14 and of the tail portion 15.

Adjacent the central portion of the rocker arm 89 and the upper ends of the rear legs 92, the forward ends of a U-shaped lever 95 are pivotally connected by means of pin members 96. Adjacent its rear end, each of the longitudinal arms of the U-shaped member 95 is pivotally connected to the tail portion 15 by means of a pin 97. The forward upper end of each of the rear legs 92 is connected to one end of a coil spring 98. The other end of each of the springs 98 is connected at 99 to a side wall of the body portion 14. A resilient buffer or stop member, preferably in the form of a rubber block 101, may be mounted upon the upper surface of the rocker arm 89 adjacent its forward end. A second resilient buffer or pair of stop members 102 may also be provided at the rear portion of the body 14 and disposed interiorly thereof for the purpose of limiting rearward rocking motion of the rear legs 92.

In the operation of the above described vehicle, the initial position of the several movable parts is illustrated in Fig. 2. From this position these parts may be moved to their full line position of Fig. 3 by downward movement of the rider's feet on the stirrup portions 84 of the levers 83. Such downward movement of the levers 83 results in the driving of the front wheels 26 in a forward or counter clockwise direction to move the mechanical horse, together with its rider, forwardly. At the same time, through the agency of the levers 88, the forward end of the rocker arm 89 is swung downwardly to cause the rear legs 92 to assume the extended or full line position of Fig. 3. If a one-way clutch mechanism is interposed between the rear wheels 93 and the legs 92, as proposed above, such attempted rearward movement of the legs 92 will also result in a forward driving action being imparted to the vehicle.

The main function of the rocker arm 89 and rear legs 92, however, is to simulate the natural gallop of a horse. This is accomplished, together with the extension of the rear legs 92, by so curving the rocker arm 89 and giving such a downward and rearward slope to the surface 94 which bears thereon as to cause the rear end of the body portion 14 of the horse to be raised in this forward movement of the vehicle. In actual practice, the upward motion of the rear portion of the horse has been made to be approximately four inches when the horse is substantially full size or approximately five feet in height. This distance which the rear end of the horse will be raised upon downward movement of the stirrup members 84 from their position of Fig. 2 to their full line position of Fig. 3 may be varied as desired by changing the slope of the bearing surface 94 and/or the curvature of the rocker arm 89.

Having given the horse such a forward driving motion, the rider may then remove the pressure upon the stirrup members 84, such as by shifting his weight to the saddle portion of the body member 14, which will result in the movable mechanism being returned to its initial position of Figs. 1 and 2. Such return movement of the movable parts will result primarily from the effect of the weight of the body portion of the horse and of the rider being transmitted by the bearing surface 94 to the rear portion of the rocker arm 89. This return movement of the movable mechanism will also be greatly aided by the coil springs 98 which have been tensioned in the initial driving movement imparted to the mechanism. This return movement of the levers 83, and consequently of the rack 80, will have no effect upon the front axle driving mechanism, because the one-way clutch mechanism 64 will run freely in this direction.

It will therefore be readily apparent that any initial impetus thus given to the horse will result in the forward coasting of the vehicle for a substantial distance, either the movable parts being allowed to return to their initial position or being maintained in their driven or extended position. The U-shaped member 95 serves to define the character of motion which will be imparted to the rocker arm 89 and the rear legs 92 by providing relative shiftable pivot points between these members and the chassis or framework of the horse. In normal operation of the vehicle the resilient stop member or buffers 101, 102 will not be needed, but they result in smoothly cushioned movement if the vehicle is operated in a violent manner.

It will also be apparent that the several points of adjustment provided by the pins 55, 57 and 85 make it possible for the driving unit 52 to be properly positioned to maintain the desired tension upon the driving chain 87, and to vary the initial position and the extent of vertical movement of the stirrup members 84. This latter feature permits adjustment of the mechanism to accommodate riders of different sizes and to vary the extent to which the rear legs 92 will be moved as illustrated in broken lines in Fig. 3. As is shown in Figs. 2 and 3, the upper rear wall portions of the front legs and the bottom wall portions of the body 14 and tail 15 are omitted to provide the necessary clearance for the several movable parts and ready access to those parts mounted interiorly thereof.

From the above description of the steering mechanism, it will be seen that the direction of movement of the horse may be changed at will, whether the horse is moving forward freely or is having a driving movement being imparted thereto. It will also be appreciated that the reins 77 may be tightened or drawn rearwardly at any time to cause a braking action of the vehicle.

Figure 9:
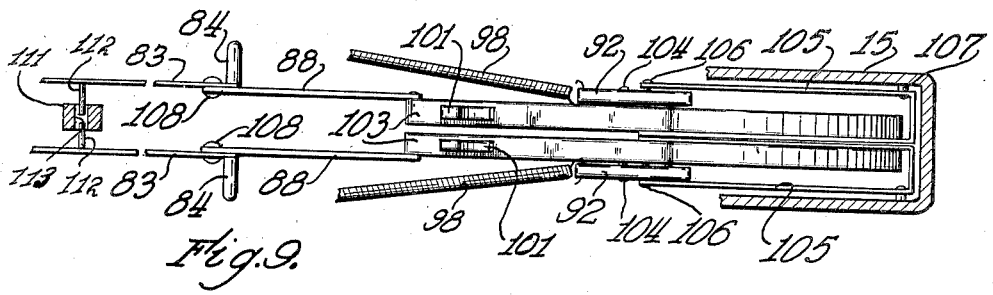
Figure 9 is a view similar to Fig. 8 of a modified construction which is adapted to permit movement of the rear legs independently of each other.

The above described actions of the mechanical horse almost perfectly simulate the gallop of a real horse. The present invention also contemplates the provision of so altering the mechanism above described as to make it possible for the rider of the mechanical horse to change its gait from a gallop to one which closely simulates a canter or a trot. In order to accomplish this optional operation of the mechanical horse, the modified construction of Fig. 9 is employed.

In this construction, the mechanism is exactly the same as that of Figs. 1 to 8, except for the rocker arm 89, the U-shaped pivotal control member 95, and the connection between the stirrup members 83, 84 and the driving rack 80 of the preferred form. In the modified construction, the upper end of each of the levers 88 is pivotally connected to the forward end of the associated one of a pair of rocker arms 103. Each of the rocker arms 103 is substantially identical in configuration and function to the rocker arm 89, with the exception that it is rigidly connected only to its associated rear leg 92 by means of pins 104. A U-shaped movement control lever 105, which is similar to the U-shaped lever 95, is pivotally connected at its forward ends by means of a pin 106 to one of the rocker arms 103 and rear legs 92. One of these U-shaped members 105 is provided for each of the rocker arm and rear leg assemblies 103, 92. Each of the rear legs 92 is provided with an individual wheel assembly, comprising one or more wheels 93, in order to allow the rear legs 92 to move independently of each other if so desired. At its rear end, each of the U-shaped members 105 is pivotally connected to the tail portion 15 by a pin 107. The forward end of each of the levers 88 is connected only to its associated stirrup member 83 by means of a pivot pin 108. Each of the stirrup levers 83 is independently connected to drive rack 111, which is similar to the drive rack 80, by a suitable pin 112 and slot 113 arrangement which will permit operation of the drive rack 111 by either of the levers 83 independently of the other. Thus, as either of the levers 83 is operated, the drive rack 111 will be actuated and its corresponding leg moved thereby.

With this modified construction, it will be readily apparent that the rider may operate the two rear legs either independently of each other in any desired manner, or simultaneously in the same manner in which the rear legs are actuated in the preferred construction.

While the preferred mode of motivating power to be used in the above described mechanical horse is to have the rider impart pressure upon the stirrups 84 by shifting his weight in the saddle portion of the body member 14. Other means of power may be readily adapted to be used to create such a forward driving movement to the horse. Such other means of power may be connected to the driving mechanism by means of links and the like. Either an electric motor or a fluid fuel combustion engine, or the like, may be so adapted for use.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A mechanical horse, comprising a hollow frame in the shape of a horse's body, front legs formed integrally with said frame for supporting the forward part of the frame having wheels associated with their lower ends, rear legs pivotally secured to the rear part of the frame and having wheels associated with their lower ends, means mounted interiorly of said frame for driving said front wheels including driving means mounted upon a shaft and having a foot-operated lever connected thereto, and means connected to said lever for swinging said rear legs rearwardly and forwardly to raise and lower the rear of said frame relative to the front part thereof.

2. A mechanical horse, comprising a hollow frame in the shape of a horse's body, front legs for supporting the forward part of the frame having stub shafts associated with their lower ends and wheels rotatably mounted on said shafts, rear legs pivotally secured to the rear part of the frame and having wheels associated with their lower ends, means for driving said front wheels including a differential disposed therebetween and driving means mounted interiorly of said frame having flexible means interconnecting said differential and said wheels, and means for moving said front wheels relative to the front legs to steer the horse.

3. A mechanical horse, comprising a frame in the shape of a horse's body, front legs for supporting the forward part of the frame having wheels associated with their lower ends, rear legs pivotally secured to the rear part of the frame and having wheels associated with their lower ends, and means for swinging said rear legs rearwardly and forwardly to raise and lower the rear part of said frame relative to the front part thereof, said means including a rocker arm rigidly secured to the upper portions of said rear legs and contacting a flat surface of said frame having a slope angularly disposed relative to a horizontal plane.

4. A mechanical horse, comprising a frame in the shape of a horse's body, front legs for supporting the forward part of the frame having wheels associated with their lower ends, rear legs pivotally secured to the rear part of the frame and having wheels associated with their lower ends, and means for swinging said rear legs rearwardly and forwardly to raise and lower the rear part of said frame relative to the front part thereof, said means comprising stirrup members adapted to be actuated by a rider of the horse, a curved rocker arm rigidly secured to the upper portions of said rear legs and contacting a flat surface of said frame having a slope angularly disposed relative to a horizontal plane, and linkage interconnecting said stirrup members and said rocker arm.

5. A mechanical horse, comprising a hollow frame in the shape of a horse's body, leg members for supporting said frame and having wheels associated with their lower ends, and means whereby a rider of the horse may impart forward movement thereto, including driving mechanism mounted upon a shaft, an auxiliary frame for rotatably supporting said shaft, and means for adjustably supporting said auxiliary frame interiorly of said hollow frame.

6. A mechanical horse, comprising a frame in the shape of a horse's body, front legs for supporting the forward part of the frame having wheels associated with their lower ends, rear legs pivotally secured to the rear part of the frame and having wheels associated with their lower ends, and means for swinging said rear legs rearwardly and forwardly to raise and lower the rear part of said frame relative to the front part thereof, said means including a rocker arm rigidly secured to the upper portion of said rear legs and contacting a flat surface of said frame having a slope angularly disposed relative to a horizontal plane, a foot operated lever, and selectively adjustable linkage interconnecting said arm and said lever.

7. A mechanical horse, comprising a hollow frame in the shape of a horse's body, leg members for supporting the front part of said frame having wheels associated with their lower ends, means whereby a rider of the horse may impart forward movement thereto, including a rotatable driving member mounted upon a shaft interiorly of and adjacent the front part of said body, an auxiliary frame for rotatably supporting said shaft, means for adjustably supporting said auxiliary frame, a driven member also mounted interiorly of said body and rotatable by said driving member in one direction only, and brake means operatively associated with said driven member.

8. A mechanical horse, comprising a frame in the shape of a horse's body, front legs for supporting the forward part of the frame having wheels associated with their lower ends, rear legs pivotally secured to the rear part of the frame and having wheels associated with their lower ends, and means for swinging said rear legs rearwardly and forwardly to raise and lower the rear part of said frame relative to the front part thereof, said means including rocker arms operable independently of each other and secured to the upper portions of each of said rear legs to swing the same by contacting a flat surface of said frame having a slope angularly disposed relative to a horizontal plane, whereby movements may be imparted to the mechanical horse to simulate any selected one of a plurality of gaits of a real horse.

ROY A. MAYPOLE.